United States Patent [19]

Saliga

[11] Patent Number: 5,673,034
[45] Date of Patent: Sep. 30, 1997

[54] SECURITY SYSTEM COMPRISING THREE APPARATUSES SHARING A TIME-VARYING CODE

[76] Inventor: Thomas V. Saliga, 4702 Baycrest Dr., Tampa, Fla. 36615

[21] Appl. No.: 399,607

[22] Filed: Mar. 7, 1995

Related U.S. Application Data

[63] Continuation-in-part of Ser. No. 133,904, Oct. 12, 1993, Pat. No. 5,397,884.

[51] Int. Cl.$^6$ ............................................. H04L 9/14
[52] U.S. Cl. ..................... 340/825.31; 340/825.34; 340/825.72; 235/382; 380/21; 380/25; 380/28
[58] Field of Search ....................... 340/825.31, 325.34, 340/825.69, 825.72; 235/382, 382.5; 361/171, 172; 380/21, 23, 25, 28

[56] References Cited

U.S. PATENT DOCUMENTS

| | | | |
|---|---|---|---|
| 3,906,447 | 9/1975 | Crafton | 340/825.31 X |
| 4,501,958 | 2/1985 | Glize et al. | 235/382 |
| 4,596,985 | 6/1986 | Bongard et al. | 340/825.31 X |
| 4,790,012 | 12/1988 | Sutphin, Jr. | 380/21 |
| 4,800,590 | 1/1989 | Vaughn | 340/825.34 X |
| 4,812,841 | 3/1989 | Chen | 340/825.31 |
| 4,888,801 | 12/1989 | Foster et al. | 380/21 |
| 4,928,098 | 5/1990 | Dannhaeuser | 340/825.31 X |
| 4,970,504 | 11/1990 | Chen | 340/825.31 |
| 5,140,317 | 8/1992 | Hyatt, Jr. et al. | 340/825.31 |
| 5,204,663 | 4/1993 | Lee | 340/825.31 X |
| 5,237,614 | 8/1993 | Weiss | 380/23 |
| 5,310,999 | 5/1994 | Claus et al. | 380/29 X |
| 5,397,884 | 3/1995 | Saliga | 340/825.31 X |
| 5,440,109 | 8/1995 | Hering et al. | 235/384 |
| 5,451,934 | 9/1995 | Dawson et al. | 340/825.31 |
| 5,485,520 | 1/1996 | Chaum et al. | 340/825.34 X |

FOREIGN PATENT DOCUMENTS

| | | | |
|---|---|---|---|
| 1 595 796 | 8/1981 | United Kingdom | 235/382 |
| 2 241 734 | 9/1991 | United Kingdom | 340/825.31 |

*Primary Examiner*—Michael Horabik
*Assistant Examiner*—William H. Wilson, Jr.
*Attorney, Agent, or Firm*—David Kiewit

[57] ABSTRACT

Complex, time varying codes (e.g., pseudo-random sequences) are used in an access regulating system that includes three types of synchronized apparatuses. The first apparatus is a central computer, or other suitable means that issues a set of time-dependent code segments to a plurality of the second, linking, type of apparatus (which may comprise end-user communication equipment). The codes are relayed by the linking apparatus to the third, access granting, apparatus that grants access (e.g., to a communication network) only if there is a match between the code from the linking apparatus and a code stored in the access granting apparatus.. The time-varying code segments are chosen so that after the expiration of a predetermined interval none of the code segments in the linking apparatus match code segments in the access-granting apparatus.

5 Claims, 5 Drawing Sheets

Fig. 6
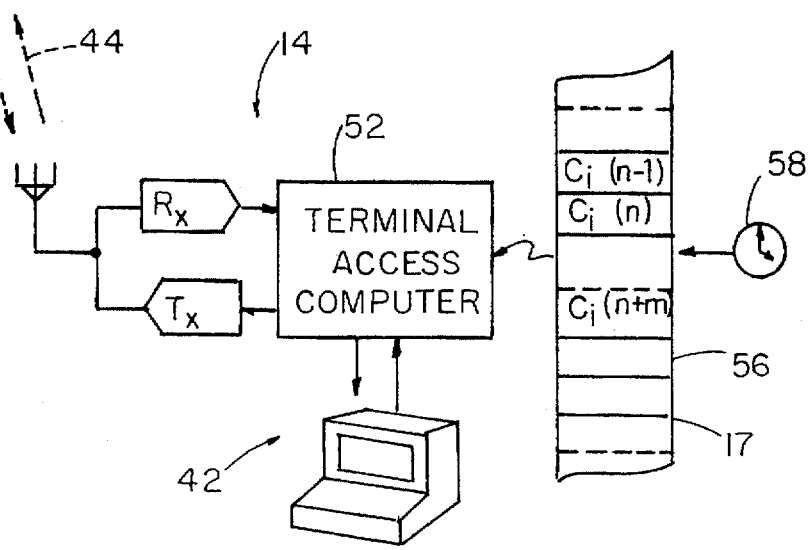
Fig. 7
| START CODE | ID/ACCESS CODE SEGMENT: $C_j[n(t)]$ | MESSAGE FIELDS | PARITY CHECK FIELD | END CODE |
Fig. 8
| START CODE | ID/ACCESS CODE SEGMENT: $C_i(n) \oplus C_i(n+1)$ | MESSAGE FIELDS: $M(i) \oplus C_i(n)$ | & PARITY FIELDS Modulo Segment length | END CODE |
Fig. 9
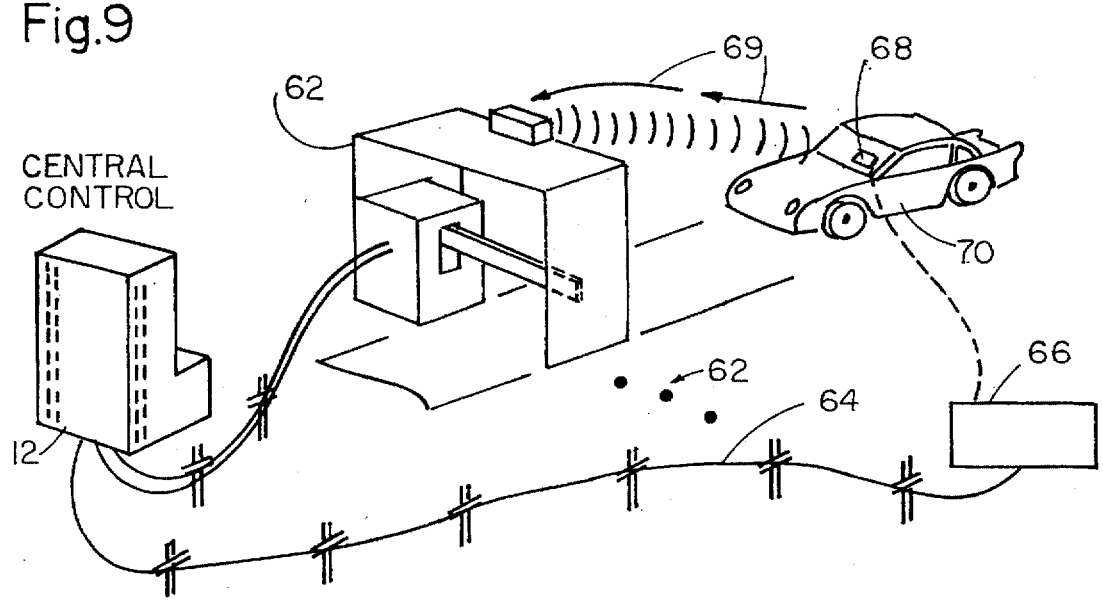

5,673,034

SECURITY SYSTEM COMPRISING THREE APPARATUSES SHARING A TIME-VARYING CODE

This application is a continuation-in-part of the inventor's U.S. application Ser. No. 08/133,904, filed Oct. 12, 1993, now issued as U.S. Pat. No. 5,397,884, wherein the inventor teaches a security system in which a central computer loads time-varying code segments into the memory of a linking device (which may be configured as a door-key).

BACKGROUND OF THE INVENTION

The linking device subsequently communicates those code segments to a remote access-controlling equipment (e.g., a computer-controlled door-lock) having time-varying access codes and granting access (e.g., unlocking the door by actuating an electro-mechanical lock) only if a code segment from the linking element memory matches the currently valid access code segment.

The systems taught in the inventor's U.S. Pat. No. 5,397,884 generally comprise a trusted apparatus (e.g., a central computer calculating a sequence of segments of a link code, each segment valid for a predetermined time interval and issuing ones of these segments) with knowledge of, or access to, all the link code segments available in the system; a plurality of remote apparatuses of intermediate trustworthiness (e.g., the controllers in the door-locks) that calculate or look up ones of a subset of the code segments, but that do not have access to codes for other remote apparatuses; and a second plurality of apparatuses (e.g., the keys) that are vulnerable to theft or compromise and that therefore are given access to only a minimum useful subset of code segments matching access codes associated with a target remote apparatus during a predetermined interval. The minimum useful subset of code segments comprises a set so small that a technically sophisticated attacker who gains access to one of the plurality of vulnerable and untrustworthy apparatuses can not use that subset of code segments to discover other codes valid during other intervals or with other targets.

The present application teaches extensions of these techniques to related security situations in which a thief or other attacker might discover an authorization code valid for a predetermined interval. Alternate approaches are taught to preventing an attacker from using the compromised, intercepted or stolen code in a theft of protected equipment or services.

It is well known, for example, that a contemporary analog cellular telephone periodically transmits its unique fixed identification code when it is in service. The security of this approach is often compromised by thieves who intercept the identification code of a legitimate cellular telephone, program that identification code into another telephone, and use the re-programmed bogus telephone to place calls billed to the owner of the legitimate telephone.

Hyatt and Hall, in U.S. Pat. No. 5,140,317, teach an electronically keyed system with a microprocessor in both the lock and the key. The key, which carries the power supply to operate the lock, has a code stored in memory. This code is supplied by a master controller and is usable for a single access, whereupon the lock resets to a different code in accordance with an algorithm known to the master controller.

Benmax, in GB 2,241,734, teaches an electronically keyed security system in which a lock and a key operate in synchrony and in which the key computes the correct code to operate the lock. A system like Benmax's that functions with a plurality of keys may be compromised by stealing a key and discovering the algorithm contained therein. Benmax teaches a system having only two elements—a lock and a key—rather than the three elements (lock, key and linking device) taught in U.S. Pat. No. 5,397,884.

Many modern communication systems rely on pseudo-random, or other, complex codes having a sequence of time-varying code segments. These coding schemes are designed so that it is very difficult to fathom the code segment sequence from an intercepted message. In many such systems the sender and receiver of the message have synchronized clocks and both use the same computer algorithm to generate, in a parallel, time-locked fashion, the encoding and decoding keys applied to a given message fragment. Coding systems of this sort are well known in the communication art and have been described, inter alia, by W. Wesley Peterson in "Error Correcting Codes" (MIT Press, 1961) and in a chapter entitled "Modulation by Pseudo-Random Sequences" in "Digital Communication with Space Applications" (Solomon W. Golomb, ed., Prentice-Hall, 1964).

SUMMARY OF THE INVENTION

It is an object of the invention to provide a direct communication path between the central control and access granting elements of a security system. Thus, a system of the invention comprises a central control apparatus (which may be a computer) loading time-varying code segments into the memory of one or more access-controlling devices (each of which may also comprise a computer). An access-granting device subsequently receives other code segments from ones of a second plurality of remote terminal apparatuses (which may comprise end-user communication equipment containing a computer), each of which is time-synchronized to the central computer, and each of which generates a time-varying code segment sequence that is a subset of the code generated by the central computer. The access-granting device grants or denies access to selected apparatus (e.g., to a communication network) only if a code segment from the remote terminal apparatus matches the currently valid access code.

In another embodiment of the invention a central control apparatus loads a set of time-varying code segments into the memory of each of a plurality of untrustworthy linking devices and loads a generally larger set of time varying code segments into a second plurality of untrustworthy access-granting apparatuses. Each access-granting apparatus has a clock synchronized with a clock in the central control apparatus. A code segment from a linking device is subsequently matched with a code segment from one of the plurality of access-granting apparatuses, and access is granted if there is a match. The time-varying code segments are chosen so that after the expiration of a predetermined interval none of the code segments in the linking devices match code segments in the access-granting devices.

It is an object of the invention to provide a system and method for the secure operation of portable apparatus subject to theft and compromise. A system of the invention comprises a secure central computer calculating a set of time-varying pseudo-random code segments; a plurality of portable remote terminals, each comprising a remote computer synchronized with the central computer and each having a subset of the central computer's set of pseudo-random code segments; and a plurality of access-controlling apparatuses, each carrying a subset of the set of time-varying code segments valid for a predetermined interval.

It is an object of the invention to provide a system for controlling the operation of protected equipment, wherein a single trusted master unit provides, via a first compromisable communication path, an authorization code to an access-granting element enjoying the same or lower level of trust as the master unit. The access-granting element receives a code segment, via a second communication path (that is at least as compromisable and subject to intercept as is the first communication path) from an untrustworthy apparatus during a predetermined authorization time period. The access-granting element enables operation of the untrustworthy apparatus only if the received code segment matches the authorization code.

It is an object of the invention to provide a security means for a communication system in which the code required to allow an end-user's terminal equipment (e.g., a cellular phone) to communicate with other elements of the system changes with time. It is also an object of the invention to provide such a system in which a single master control unit generates and provides the necessary code segments to a relay or routing apparatus that enables communication between two end-users during a predetermined interval.

It is an additional object of the invention to provide a system having a plurality of time-variable access levels so that a secured equipment may operate a limited number of times during an interval within an overall period of authorization.

DESCRIPTION OF THE DRAWING

FIG. 6 of the drawing is a block diagram showing the functional organization of the remote terminal element of FIG. 3.

FIG. 7 of the drawing is a schematic diagram showing the format of a data packet used in the system of FIG. 3.

FIG. 8 of the drawing is a schematic diagram showing an alternate format of a data packet used in the system of FIG. 3.

FIG. 9 of the drawing is a schematic view of a system of the invention applied to a toll-booth or other regulated gateway.

DETAILED DESCRIPTION

Figure 1:
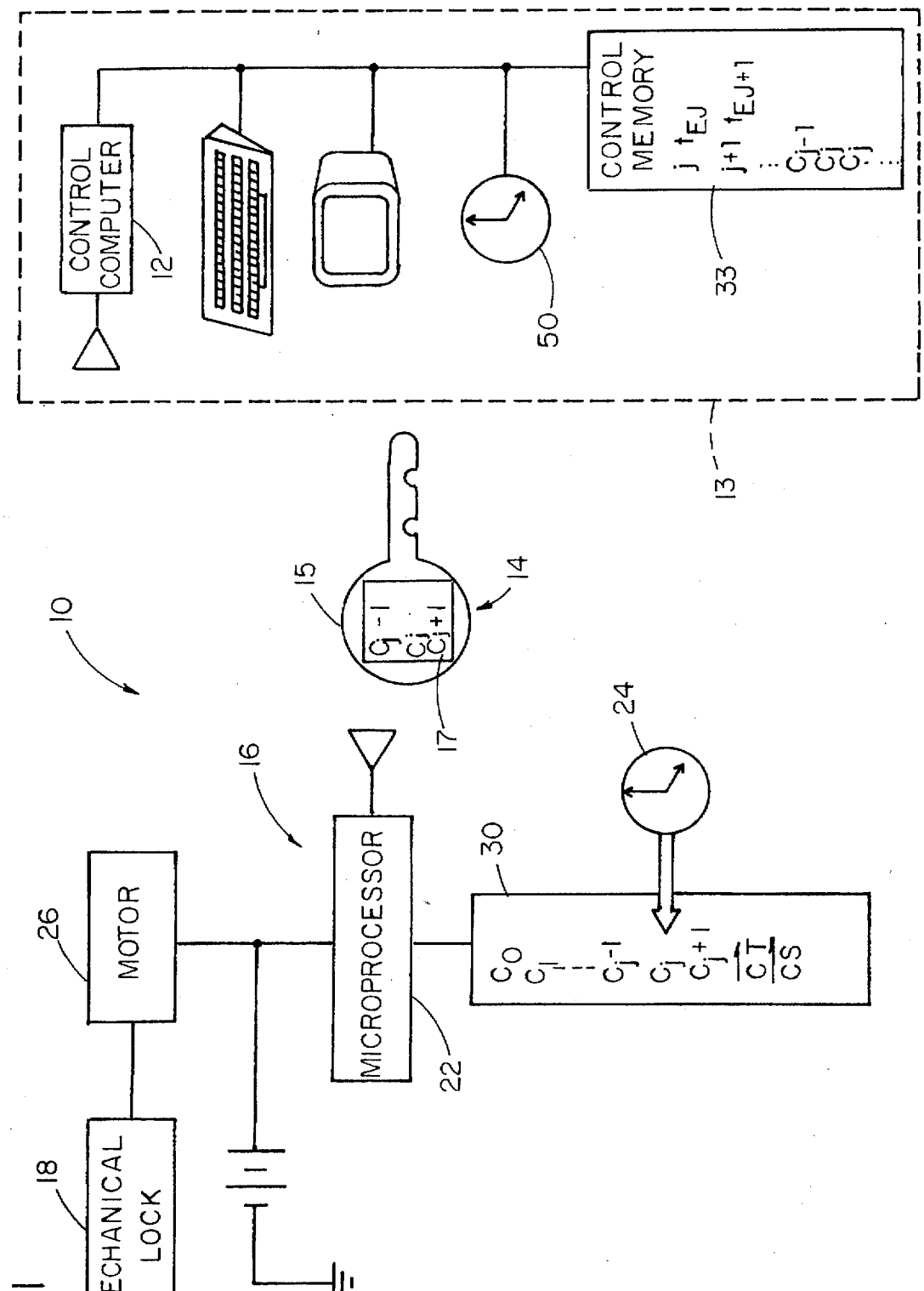
FIG. 1 of the drawing is a block diagram of a system of the invention described in the inventor's U.S. Pat. No. 5,397,884.

Turning initially to FIG. 1 of the drawing, one finds a schematic overview of a security system 10 taught in the inventor's U.S. Pat. No. 5,397,884. In this system a central control computer 12 (which may be located in a secure area 13 near a reception desk in a hotel) generates time-varying access code segments, shown as $c_j$ in the drawing, and transfers one or more code segments (each of which is respectively valid for one of a plurality of time intervals) to a linking device 14 (which may be configured as a hotel room key 15). The linking device 14 carries the code in a linking memory 17 to a remote access-granting apparatus 16 (which may be a lock controller built into a hotel room door) that is synchronized with the central computer 12 and that generates a second set of time-varying access code segments $c_j$ that is a subset of the codes generated by the central computer 12. If the code segment in the linking device 14 matches an access code valid for the current time interval (or, perhaps, for either the immediately preceding or immediately following interval), the access-granting apparatus 16 permits access (e.g., operates the lock 18 on the hotel room door). Alternate data communication paths taught in the inventor's U.S. Pat. No. 5,397,884 (e.g., the use of a secure guard's key apparatus) provided a non-realtime means to re-synchronize the access 24 and master 50 clocks.

Figure 2:
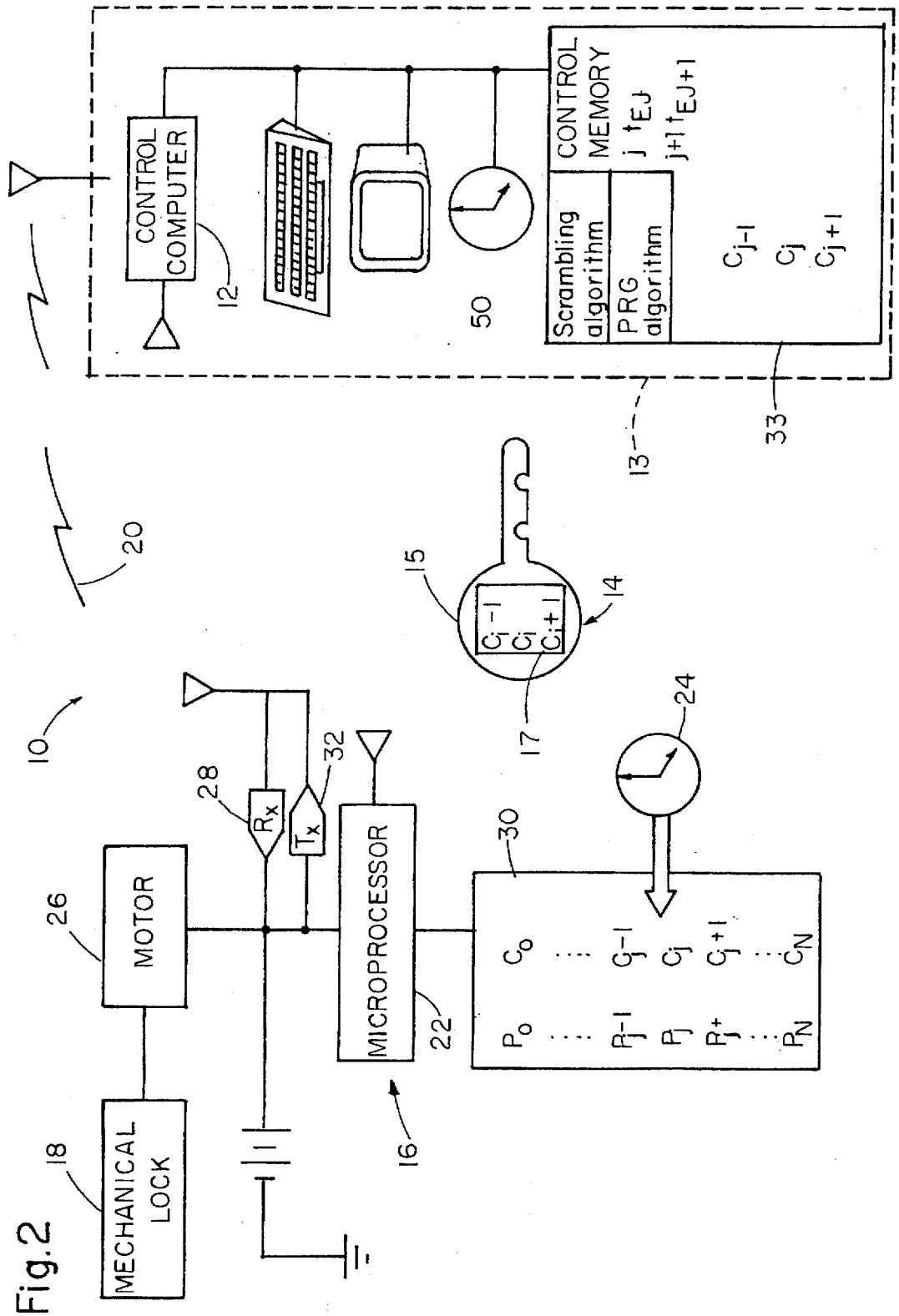
FIG. 2 of the drawing is a block diagram of a system of the invention in which an access-granting apparatus and a linking device receive time-varying authorization code segments from a central controller.

Turning now to FIG. 2 of the drawing, one finds a somewhat different security system of the invention in which a central computer 12, which may be located in a secure area 13 near the reception desk of a hotel, has an intermittent broadcast-type link 20 (e.g., low power RF transmission) to all the access-granting apparatuses 16. In this system each access-granting apparatus 16 comprises a microcomputer 22, an access clock 24, an actuator such as a motor 26, a mechanical locking mechanism 18, and a radio receiver 28. All door locks 16 in this system have the same code segment $p_O \ldots p_N$ in memory 30, and use this code segment to descramble a transmission from the central computer 12. The receiver 28 in an access-granting apparatus 16, is enabled by its associated clock 24 in a predetermined assigned "time-slot". Thus, at a selected instant, the central computer 12 would transmit a scrambled code only to a single door lock receiver 16 that was enabled then. The received and descrambled code segments would be stored in memory 30 and used with linking devices 14 (e.g., room keys 15) having matching code segments valid for a selected interval (e.g., a day). Optionally, in this system, an access-granting apparatus 16 could also comprise a radio transmitter 32 enabled at the same time as the associated receiver 28 and used to transmit, to the central computer 12, a short burst acknowledging receipt of the message.

In yet another version of the system of the invention, a plurality of access-granting apparatuses (e.g., door locks at a secured facility having a large number of employees) can receive segments of a time-varying code from a central trusted controller 12 via a potentially compromisable data link 20. Each authorized user would be issued a linking device 14 comprising unpowered non-volatile escort memory (e.g., an employee badge or gate key) containing a second set of time-varying code segments. This version of the system would function in a similar manner to the hotel room-key system taught in the inventor's U.S. Pat. No. 5,397,884, save that the access-granting apparatuses 16 would be less vulnerable to attack by wont of not having access to the entire code set. Moreover, any authorized user could gain access to the facility through any gate controlled by any access-granting apparatus 16.

In these modified versions of the system of the invention, only the central computer 12 has the complete code generating algorithm. As taught in the inventor's U.S. Pat. No. 5,397,884, this may be a pseudo-random code generating algorithm that generates the currently valid set of code segments for the jth access control apparatus 16 by using the current time and an epochal time, $t_{ej}$, unique to the jth access control apparatus. As described therein, the central control computer 12 may receive the current time value from a master clock 50, and may store the algorithm and a table of values of the epochal times in a control memory 33. The access-granting apparatus 16, which communicates with the central controller 12 via a potentially compromisable communication path 20, may have algorithmic means for descrambling or decoding a message received from the central computer 12, but the access-granting apparatus 16 in this embodiment of the invention does not have means for generating the entire set of authorization codes. The access-granting apparatus 16 of this embodiment of the invention receives one or more tables of time-varying code segments valid for an authorization interval and has means of stepping through the table or tables of code segments in response to a current time value output by an access clock 24. In cases where a plurality of end-user equipments 14 may obtain access (e.g., a hotel in which both a guest and a maid have a room key 15) via a single access controlling equipment 16, the access-controlling equipment 16 has a separate table of code segment values for each authorized user.

Figure 3:
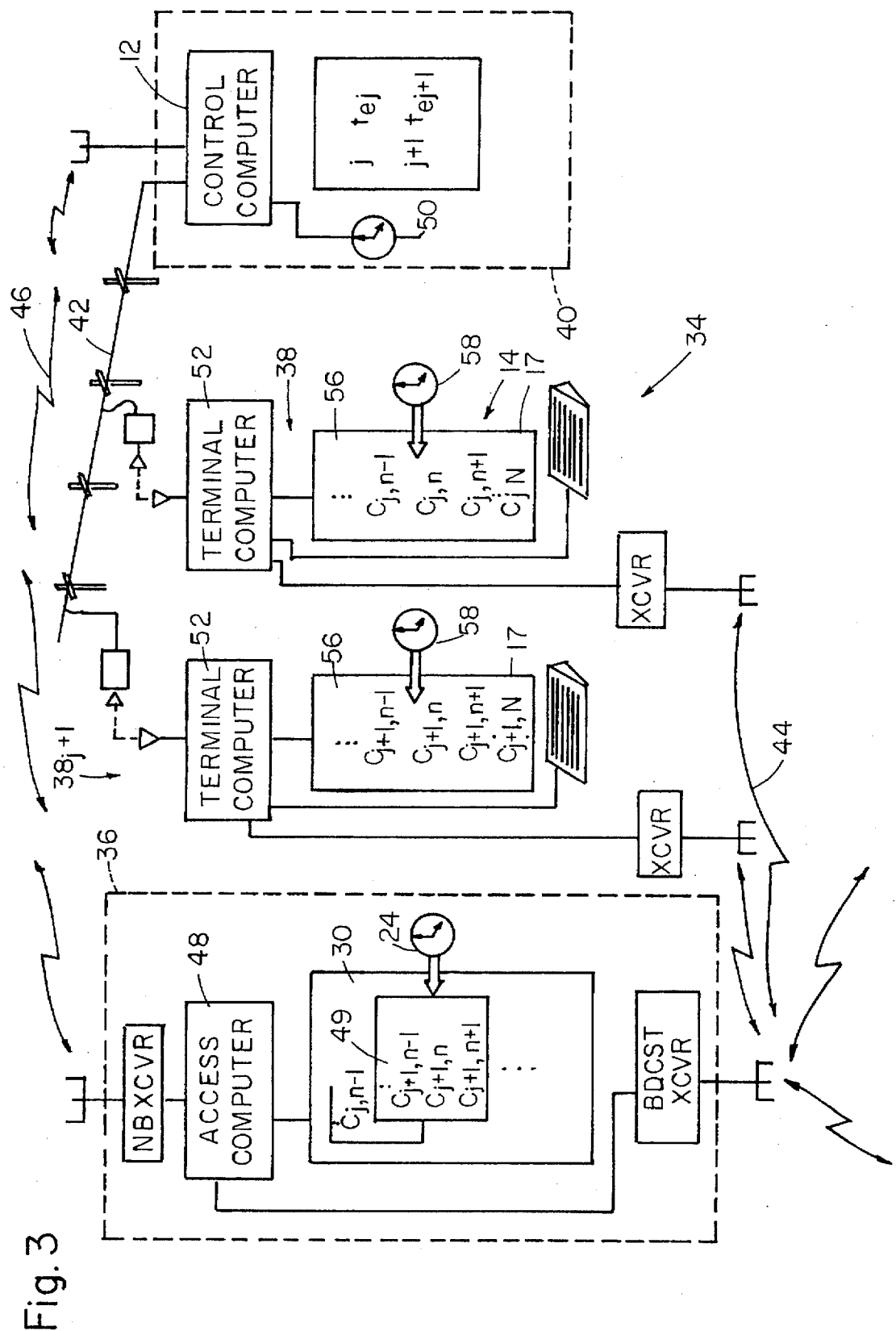
FIG. 3 of the drawing is a block diagram of a system of the invention applied to a satellite communication network.

Turning now to FIG. 3 of the drawing, one finds a communication system 34 in which the access-granting device is a satellite repeater 36. The jth remote terminal 38j (which serves the function of the linking element 14 previously discussed) stores the jth set of time-varying access code segments, $c_{jn}$, generated by the central computer 12. The remote terminal 38j, $38_{j+1}$ occasionally communicate with the central computer 12 (which in the example shown, is a network controller 40) to be re-synchronized and reauthorized and to have their linking clocks 58 re-synchronized with the master clock 50. This communication path may be via land lines 42, or via the combination of a narrow beam 46 between the network controller 40 and the satellite 36 and a conventional wide-beam communication path 44 used to transmit a message from a first user data station 38 to the communication satellite 36, which routes and repeats that message (if the transmitting user data station is permitted access to the communication network) to a second user data station.

Figure 4:
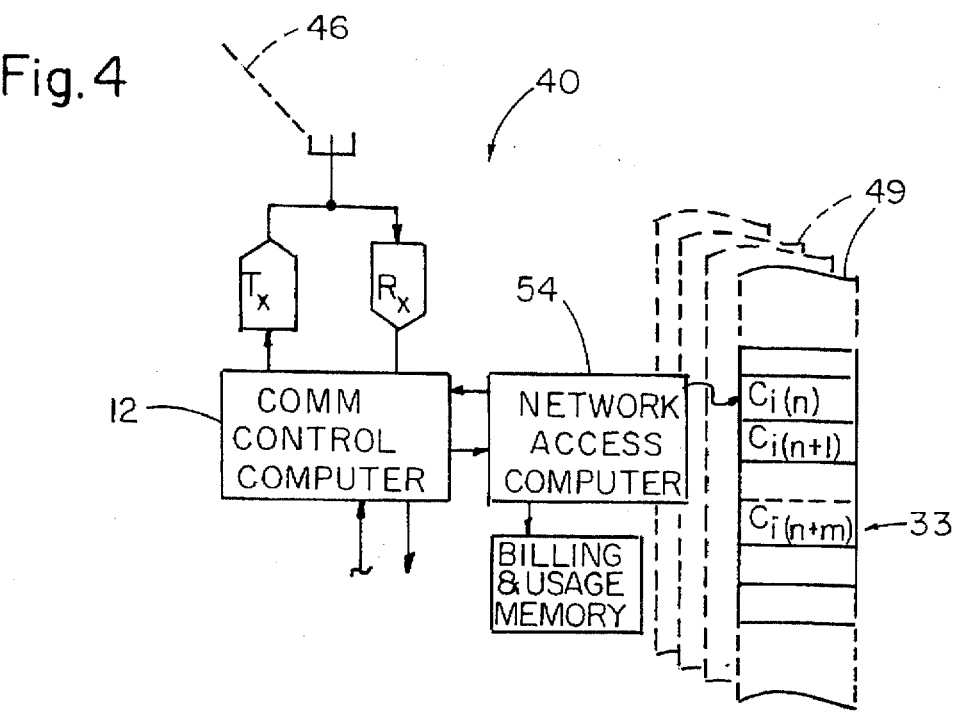
FIG. 4 of the drawing is a block diagram showing the functional organization of the master control element of FIG. 3.
Figure 5:
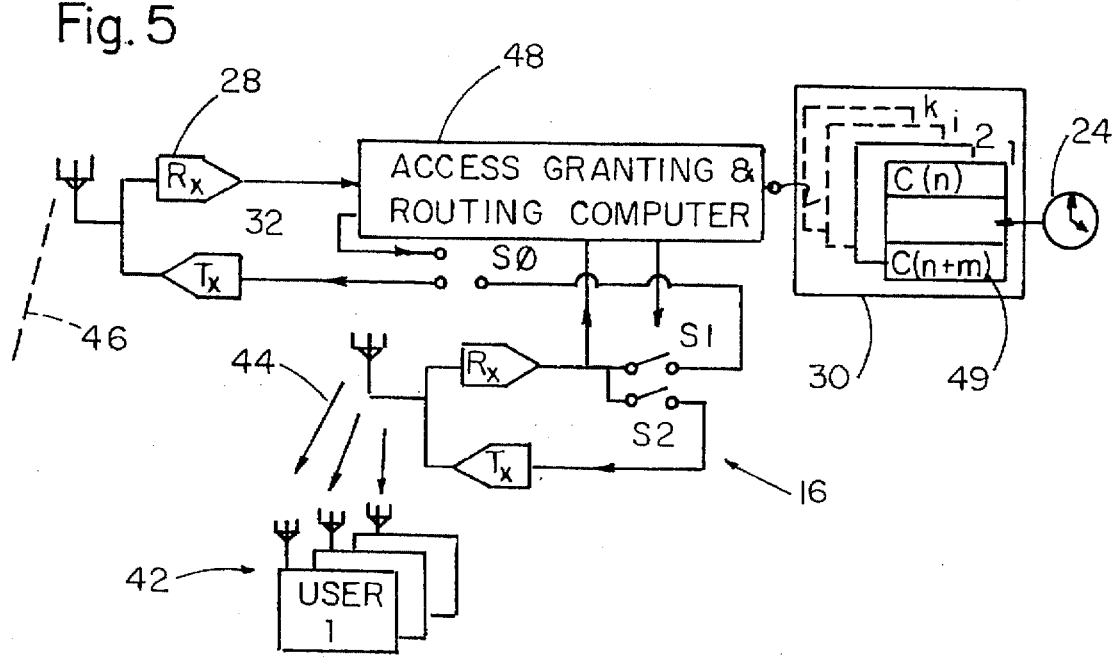
FIG. 5 of the drawing is a block diagram showing the functional organization of the satellite repeater and routing apparatus of FIG. 3.

In the system of FIG. 3 it is expected that there will be a single network control station 40. Even if back-up stations (not shown) are provided, the number of network control stations 40 is expected to be small, and each network control station 40 will operate at the system's maximum level of security and comprise a trusted central control computer 12 generating a set, $C_{jn}$, of time-varying access code segments for a plurality of users. As shown in FIG. 4 of the drawing, a network access computer 40 may generate a set, $C_{j(n-m)}$ . . . $C_{jn}$ . . . $C_{j(n+p)}$ (which is a subset of the overall set) of access code segments specific to the jth qualified user of the network for a predetermined interval. For example, the network computer 40 may code segments, $C_{jn}$, where n runs from n=0 to n=1399, to define a different valid access code segment for each minute of a day, The set, $\{C_{jn}\}$, of all code segments valid for all users may then be transmitted to a communication satellite 36 and stored in an access memory 30 operatively associated with an access-granting and routing computer 48 on-board the satellite 36. These code segments may be stored, for example, as shown in FIGS. 3–6, as a separate memory page 49 for each authorized user. Although the drawing shows only a single communication satellite 36, it will be understood that a communication network may use multiple satellites or multiple transponders on a given satellite. Transmission of the code set from the network control center 40 to the satellite 36 is preferably done via a relatively narrow beam path 46 having a generally high level of security due to the narrow beamwidth, data encoding, and other known measures. Because all the valid access code segments for a day are transmitted over this link, it is expected that additional security measures (e.g., message scrambling) may be used in this portion of the system. The communication path 44 between the satellite 36 and the user terminal equipment 38j, however, is typically broadcast in nature and is subject to monitoring, to message interception and to usage piracy. It will be understood that the narrow beam communication path 46 can be used to synchronize an access time-keeping means 24 operatively associated with the access-granting and routing computer 48 with a master clock 50 maintained at the network controller 40.

A large number of user-operated terminal equipments 38j may be employed with the small number of satellites 36 and network controllers 40 in the communication system 34. The jth such terminal apparatus 38j preferably comprises a terminal computer 52 having a look-up table of its time varying access code segments $C_{jn}$ in an associated terminal memory 56, and having a terminal clock 58 selecting the appropriate code segment for any given time at which access to the network 34 is to be requested. Whenever the terminal equipment 38j seeks access to the data transmission network, a message packet 60 comprising a code, $c_{j,n(t)}$, appropriate to the instant of transmission, t, is sent to the satellite 36. An exemplar message packet 60 is shown in an overt version in FIG. 7 of the drawing, and in a scrambled version in FIG. 8 of the drawing. If this time-varying code, $c_{j,n(t)}$, matches one of the code segments stored in the access-granting apparatus memory 30, the data terminal 38j is uniquely identified for billing purposes and the message is routed along the network 34 in conventional fashion. If, on the other hand, no match is found, the message is not transmitted and the terminal equipment 38j is effectively denied access to the network 34.

It will be understood that other communication systems (e.g., cellular telephones) analogous to the satellite communication system example may be controlled by similar means. A cellular telephone system may comprise a central network control computer, a plurality of cellular antenna sites and a much larger plurality of cellular telephones, each of which broadcasts a fixed identification code both at the start of a message and periodically whenever it is in service. Application of the system of the invention to a cellular telephone would provide a system in which each telephone also transmitted a time-varying identification code that could be compared by a routing computer 48 at the nearest cellular antenna site to the list of all currently valid code segments to see if the telephone in question was to be allowed access to the network. Augmenting a fixed user ID with a time-varying code would defeat the well-known technique of monitoring a call from a legitimate cellular phone, copying the legitimate telephone's identification code into another instrument and using the second telephone to place calls billed to the operator of the legitimate phone. It is anticipated that a fixed user ID would still be employed in a system of the invention in the interest of data handling efficiency—i.e., first checking a user ID in a hierarchically organized list and then checking the received code segment against the currently valid code segment for that user is usually more efficient than searching through all the possible code segments until either a match is found or the list is exhausted.

Turning now to FIG. 9 of the drawing, one finds a system of the invention employed in controlling the operation of a toll-booth 62. A central control computer 12 may issue, via a supervised datalink 64, a block of time-varying code segments (e.g., each code could be valid for a specific one-hour period within an overall authorization period of one month) to a terminal 66 that validates an ID tag 68 to be carried in a commuter's automobile 70 by loading the code block into a linking memory 17 within the card 68. This block of code segments would also be loaded, as a user-specific page 49 into computer memories 30 respectively associated with computers 22 at each of a plurality of toll gates 62. Each toll-booth 62 in the system 10 would then interrogate an approaching automobile 70 and receive transponded responses (e.g., by means of known microwave communication beams 69) in which signals from a read-out transmitter power a nearby transponder and cause it to transmit a coded message) from any automobile 70 carrying an ID card 68.

The use of time-varying access code segments in a toll collecting system allows the system to operate on a subscription basis. Since the system of the invention provides a plurality of code segments structured so that each code segment is valid for only a sub-interval of the subscription period, several additional security features are possible. For example, the time required for a car 70 to go from a first toll-booth 62 where it enters a toll road to a second toll-booth where it leaves the toll road may be measured. Data of this sort may be useful in traffic control studies. Moreover, the toll road security system may be configured so that once a toll-booth 62 has allowed a car 70 having a subscription ID tag 68 to enter a toll road on which a single toll is required, all toll gates 62 will thereafter forbid passage to that particular ID tag 68 for a predetermined interval (e.g., one hour). Limiting the number of accesses permitted to an authorized user during a predetermined period could eliminate some varieties of toll road fraud. For example legitimately acquiring an ID card 68 and copying the code segments from the memory 17 into other cards creates an uncontrolled plurality of bootleg cards, each of which could be valid for a one month subscription period. If, however, the use of a first of these bootleg cards precluded any other bootleg card user from entering the toll road for an hour, the desirability of the bootleg card would be very low, as each user of a bootleg card would have substantial probability of detection each time the card was used.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed and desired to be secured by Letters Patent is:

1. In an electronic security system comprising an access-granting apparatus, a linking apparatus and a central computer issuing a link code segment, the access-granting apparatus comprising an access clock having an output, and an access computer having an access memory, the linking apparatus comprising a link memory, the linking apparatus receiving the link code segment from the central computer and communicating the link code segment to the access-granting apparatus which thereupon grants access to a protected apparatus if the link code segment matches an access code segment stored in the access memory, the access-granting apparatus otherwise thereupon denying access thereto, an improvement wherein the central computer comprises a master clock having an output communicated by a first synchronization means to the access clock whereby the access clock is synchronized to the master clock, and the linking apparatus comprises a linking clock and a linking computer operatively associated with the linking memory, the output of the master clock communicated by a second synchronization means to the linking apparatus whereby the linking clock is synchronized to the master clock.

2. The system of claim 1 wherein the access-granting apparatus, having granted access to the protected apparatus responsive to the link code segment matching the access code segment, for a predetermined interval thereafter denies access if that link code segment matching the access code segment is again communicated to the access computer during the predetermined interval.

3. The system of claim 1 wherein the second synchronization means comprises a first part of a message transmitted over the public switched telephone network, a second part of the message comprising means whereby the link code segment is received from the central computer.

4. The system of claim 1 wherein the synchronization means communicating the output of the master clock to the access clock comprises an RF link.

5. The system of claim 1 wherein the access computer uses an access code segment generating algorithm having as inputs the output of the access clock, an epochal time datum and an initial state datum to generate the access code segment.

* * * * *